United States Patent
Chavez-Pirson et al.

(10) Patent No.: US 7,688,500 B2
(45) Date of Patent: Mar. 30, 2010

(54) OPTHALMIC OPTICAL COHERENCE TOMOGRAPHY (OCT) TEST STATION USING A 1 μM FIBER ASE SOURCE

(75) Inventors: Arturo Chavez-Pirson, Tucson, AZ (US); Shibin Jiang, Tucson, AZ (US); Wenyan Tian, Tucson, AZ (US)

(73) Assignee: NP Photonics, inc., Tucson, AZ (US)

( * ) Notice: Subject to any disclaimer, the term of this patent is extended or adjusted under 35 U.S.C. 154(b) by 0 days.

(21) Appl. No.: 12/231,139

(22) Filed: Aug. 29, 2008

(65) Prior Publication Data

US 2009/0033871 A1 Feb. 5, 2009

Related U.S. Application Data

(62) Division of application No. 11/328,278, filed on Jan. 9, 2006, now Pat. No. 7,423,803.

(51) Int. Cl.
*H01S 3/00* (2006.01)
(52) U.S. Cl. .................................. 359/341.1; 356/479
(58) Field of Classification Search .............. 359/341.1; 356/479
See application file for complete search history.

(56) References Cited

U.S. PATENT DOCUMENTS

| | | | |
|---|---|---|---|
| 4,938,556 A | 7/1990 | Digonnet et al. | |
| 6,424,762 B1 | 7/2002 | Lauzon | |
| 6,700,697 B2 | 3/2004 | Nikolajsen | |
| 6,911,160 B2 | 6/2005 | Myers | |
| 6,982,997 B1 | 1/2006 | Jiang et al. | |
| 2003/0103212 A1* | 6/2003 | Westphal et al. | 356/479 |
| 2003/0168154 A1 | 9/2003 | Myers | |
| 2004/0109225 A1* | 6/2004 | Hu et al. | 359/341.1 |
| 2005/0134185 A1 | 6/2005 | Kim | |

OTHER PUBLICATIONS

James G. Fujimoto, "Optical coherence tomography for ultrahigh resolution in vivo imaging" Nature Biotechnology vol. 21, No. 11, Nov. 2003 pp. 1361-1367.

(Continued)

*Primary Examiner*—Mark Hellner
(74) *Attorney, Agent, or Firm*—Eric A. Gifford (57) ABSTRACT

A phosphate glass 1-μm fiber ASE source provides high power and broadband emission that covers wavelengths on the short side of Yb-doped silica. A single-mode fiber formed from phosphate glass is doped with highly elevated concentrations of Yb dopants 0.5-30 wt. % and typically 2-10 wt. %, far higher than either silica or germano-silicate. The high concentration of Yb dopant absorbs the pump in a short length, typically 10-150 cm instead of tens of meters, to provide high saturated output power and a shifted emission spectrum. The excess power allows the fiber ASE source to be configured to provide the output powers, emission bandwidth and stability desired by many applications. Furthermore, the ASE can be configured to emit a nearly Gaussian spectral profile without sacrificing power or bandwidth. The backward emission spectrum of Yb-doped phosphate glass is centered near 1020 nm instead of 1060, which allows the ASE source to cover wavelength on the short side of Yb-doped silica, which may be important in certain applications such as ophthalmic OCT where water absorption has a transparency window.

18 Claims, 9 Drawing Sheets

OTHER PUBLICATIONS

A F Fercher et al. "Optical coherence tomography—principles and applications" Institute of Physics Publishing, Rep. Prog. Phys. 66 (2003), pp. 238, 160-265 and 291.

D. Dagenais et al. "Wavelength stability characteristics of a high-power, amplified superfluorescent source" Jnl of Lightwave Tech, vol. 17, No. 8, Aug. 1999, pp. 1415-1422.

S.V. Chernikov et al. "A 75-nm, 30-mW superfluorescent ytterbium fiber source operating around 1.06 um" CLEO '97 pp. 83-84 Tues Morning.

J. Lee et al. "Passive erbium-doped fiber seed photon generator for high-power Er3+-doped fiber fluorescent sources with an 80-nm bandwidth," Opt. Lett. 24, 279-181 (1999).

R. Paschotta, "Efficient Superfluorescent Light Sources with Broad Bandwidth" Selected Topics in Quantum Electronics, IEEE Journal of vol. 3, Issue 4. Aug. 1997 pp. 1097-1099.

\* cited by examiner

Example 1

| No.1 | P2O5 | Al2O3 | La2O3 | Yb2O3 | BaO | B2O3 | ZnO | Total |
|---|---|---|---|---|---|---|---|---|
| Wt% | 64 | 5 | 0.3 | 2.00 | 27 | 1 | 0.7 | 100.0 |

Example 2

| No.2 | P2O5 | Al2O3 | La2O3 | Yb2O3 | BaO | B2O3 | ZnO | Total |
|---|---|---|---|---|---|---|---|---|
| Wt% | 61.05 | 4.17 | 0.00 | 5.79 | 26.69 | 1.19 | 1.11 | 100.00 |

Example 3

| No.3 | P2O5 | Al2O3 | La2O3 | Yb2O3 | BaO | B2O3 | ZnO | Total |
|---|---|---|---|---|---|---|---|---|
| Wt% | 59.62 | 4.07 | 0.00 | 8.00 | 26.06 | 1.16 | 1.08 | 99.99 |

Example 4

| No.4 | P2O5 | Al2O3 | La2O3 | Yb2O3 | BaO | B2O3 | ZnO | Total |
|---|---|---|---|---|---|---|---|---|
| Wt% | 56.65 | 3.87 | 0.00 | 12.57 | 24.77 | 1.10 | 1.03 | 99.99 |

Example 5

| No.5 | P2O5 | Al2O3 | La2O3 | Yb2O3 | BaO | B2O3 | ZnO | Total |
|---|---|---|---|---|---|---|---|---|
| Wt% | 55.08 | 3.76 | 0.00 | 15.00 | 24.08 | 1.07 | 1.00 | 99.99 |

OPTHALMIC OPTICAL COHERENCE TOMOGRAPHY (OCT) TEST STATION USING A 1 µM FIBER ASE SOURCE

CROSS-REFERENCE TO RELATED APPLICATIONS

This application is a divisional and claims the benefit under 35 U.S.C. Section 121 of the following and commonly-assigned U.S. utility patent application, which is incorporated by reference herein: U.S. patent application Ser. No. 11/328,278, entitled "1-µM PHOSPHATE-GLASS FIBER AMPLIFIED SPONTANEOUS EMISSION (ASE) SOURCE", by Arturo Chavez-Pirson et al, filed on Jan. 9, 2006 now U.S. Pat. No. 7,423,803.

BACKGROUND OF THE INVENTION

1. Field of the Invention

This invention relates to a 1-µm fiber Amplified Spontaneous Emission (ASE) source.

2. Description of the Related Art

Fiber ASE sources are broadband light sources based on the emission properties dictated by the energy structure of dopant ions in the glass host. A pump laser energizes the dopant ions so that spontaneously emitted light from one ion propagates along the fiber where it is amplified by the gain properties of the fiber and emitted as ASE. Light is emitted in both forward and backward directions, relative to pump direction, but the backward ASE, or counter-pumped direction, has a higher quantum efficiency and is selected as the source output. Unlike lasers, ASE sources do not rely on optical feedback, and thus the full-width half-maximum (FWHM) bandwidth of the backward ASE is generally very broad, typically between 10 and 30 nanometers, with a very short coherence length, typically less than 50 µm.

The relation between coherence length and FWHM bandwidth is given by:

$$\Delta z = \ln(2)(2/\pi)(\lambda^2/\Delta\lambda)$$

Where $\lambda$ is the source mean wavelength, $\Delta\lambda$ is the FWHM bandwidth, and $\Delta z$ is the coherence length. The wider the FWHM bandwidth the shorter the coherence length.

ASE sources are widely used for test and measurement in such fields as optical spectroscopy of materials, optical component testing, optical coherence tomography, and optical fiber gyroscopes. The incoherent light source enables measurement of insertion loss, crosstalk, bandwidth, polarization dependencies, and other parameters of passive optical components versus wavelength. The most common fiber ASE source comprises a single-mode pump that energizes a length of Er-doped single-mode silica fiber, typically tens of meters, to emit at 1.5 µm. In these ASE sources there is a tradeoff between (1) power and (2) emission bandwidth (coherence length) and spectral stability/purity. If the source is configured for high power, the bandwidth will be narrower, hence coherence length longer and the spectral properties will suffer. Much effort has been made to provide fiber ASE sources that provide all of these properties. In addition, some applications require not only a short coherence length but an emission bandwidth that covers a different range of wavelengths than is supported by conventional sources. For example, in ophthalmic OCT two separate light sources centered at 850 nm and 1300 nm are used to perform retinal and corneal scans, respectively. It would be very useful to have a single light source with the power, penetration depth, coherence length and bandwidth capability to perform both tests simultaneously.

A stable, broad-band two-stage superfluorescent source at 1.55 µm was demonstrated using an erbium-doped fiber (EDF) seed source and a high-power Er—Yb fiber amplifier. The source exhibited from 140 to 220 mW of power, 18 to 28 nm bandwidth, with an estimated mean wavelength stability from 1 to 10 ppm. The use of second light source to "seed" the primary gain fiber with forward ASE enabled the source to provide the high power, large bandwidth and stable wavelength reported. (See Dagenais et al. "Wavelength Stability Characteristics of a High-Power, Amplified Superfluorescent Source" Journal of Lightwave Technology. Vol. 17, No. 8, pp. 1415-1422 August 1999.

A 75-nm, 30-mW superfluorescent ytterbium fiber source operating around 1.06 µm was reported by Chernikov et al. "A 75 nm, 30-mW superfluorescent ytterbium fiber source operating around 1.06 µm", Conference on Lasers and Electro-Optics (CLEO), Paper CTuG8, 1997). The source is configured with three sections of Yb-doped germano-silicate fiber. The first section (amplifier) is pumped to provide backward ASE at 1 µm with a 40-nm spectrum. The third section is pumped to seed the amplifier, which broadens the spectrum to as much as 60-nm. The second inner section is unpumped and used with a spectrally optimized mirror M1 to provide spectrally controlled feedback to achieve a spectral width up to 76 nm. By reducing the FWHM bandwidth, the source can output a smooth Gaussian-like spectral shape that is preferred for such applications as OCT. This approach provides a broadband 1-µm fiber ASE source centered at 1060 nm but is complicated by the unpumped fiber and spectrally tailored mirror, which make the source less stable and more expensive. Furthermore, to achieve the spectral shape desired for OCT bandwidth must be sacrificed. Although the bandwidth is broad, when centered at 1060 nm the source is unable to reach certain shorter wavelengths below 1040 nm. Furthermore, photodarkening limits the doping % to less than about 0.2-0.3 wt. %. Consequently to achieve the desired wavelengths and output powers the silica based fiber is typically tens of meters in length.

SUMMARY OF THE INVENTION

The present invention provides a high-power broadband 1-µm fiber ASE source with a high level of power and spectral stability that covers wavelengths on the short side of Yb-doped silica.

This is accomplished with a single-mode fiber formed from phosphate glass and doped with ytterbium (Yb). Phosphate glass supports highly elevated concentrations of Yb dopants 0.5-30 wt. % and typically 2-10 wt. %, far higher than either silica or germano-silicate. The high concentration of Yb dopant absorbs the pump in a short length, typically 10-150 cm instead of tens of meters, to provide high saturated output power. The excess power allows the fiber ASE source to be configured to provide the output powers, emission bandwidth and stability desired by many applications. Furthermore, the ASE can be configured to emit a nearly Gaussian spectral profile without sacrificing power or bandwidth. The backward emission spectrum of Yb-doped phosphate glass is centered near 1020 nm instead of 1060 nm, which allows the ASE source to cover wavelength on the short side of Yb-doped silica, which may be important in certain applications such as ophthalmic OCT where water absorption has a transparency window.

Using conventional backward pumping geometries, the phosphate-based ASE source can achieve fairly wide bandwidths. To increase the bandwidth and improve the spectral shape, a number of different pumping configurations and ASE architectures can be used. To increase output power, the gain fiber may be pumped from both ends in a "dual-pumping" configuration or pumped with a multi-mode pump. To extend the bandwidth, the forward ASE of a second pumped gain fiber, either phosphate or a different glass host, can be used to seed the gain fiber. Alternately, a number of phosphate fibers with varying concentrations of Yb can be concatenated to form a fiber chain that extends the bandwidth. Filters such as spectral shaping filters or gain flattening filters can be included to provide the desired output spectrum.

The 1-µm fiber ASE source is well suited for OCT and particularly for performing a single-pass procedure for both retinal and corneal scans. The phosphate-based ASE source has sufficient power and bandwidth to deeply penetrate both corneal and retinal tissue and provide high spatial resolution slices in a single pass. Because the source has an abundance of power and bandwidth, the backward ASE can be filtered to emit with a nearly Gaussian spectral profile, which is considered highly advantageous for OCT imaging systems.

These and other features and advantages of the invention will be apparent to those skilled in the art from the following detailed description of preferred embodiments, taken together with the accompanying drawings, in which:

DETAILED DESCRIPTION OF THE INVENTION

The present invention provides a high-power broadband 1-µm fiber ASE source with a high level of power and spectral stability that covers wavelengths on the short side of Yb-doped silica. The fiber ASE source is formed from phosphate glass and doped with high concentrations, 0.5-30 wt. %, ytterbium (Yb). The high concentration of Yb dopants provide excess power that allows the fiber ASE source to be configured to provide the output powers, emission bandwidth and stability desired by many applications. The ASE can be configured to emit a nearly Gaussian spectral profile without sacrificing power or bandwidth. The backward emission spectrum of Yb-doped phosphate glass is centered near 1020 nm instead of 1060 nm, which allows the ASE source to cover wavelengths on the short side of Yb-doped silica.

Fiber ASE Source

Figure 1:
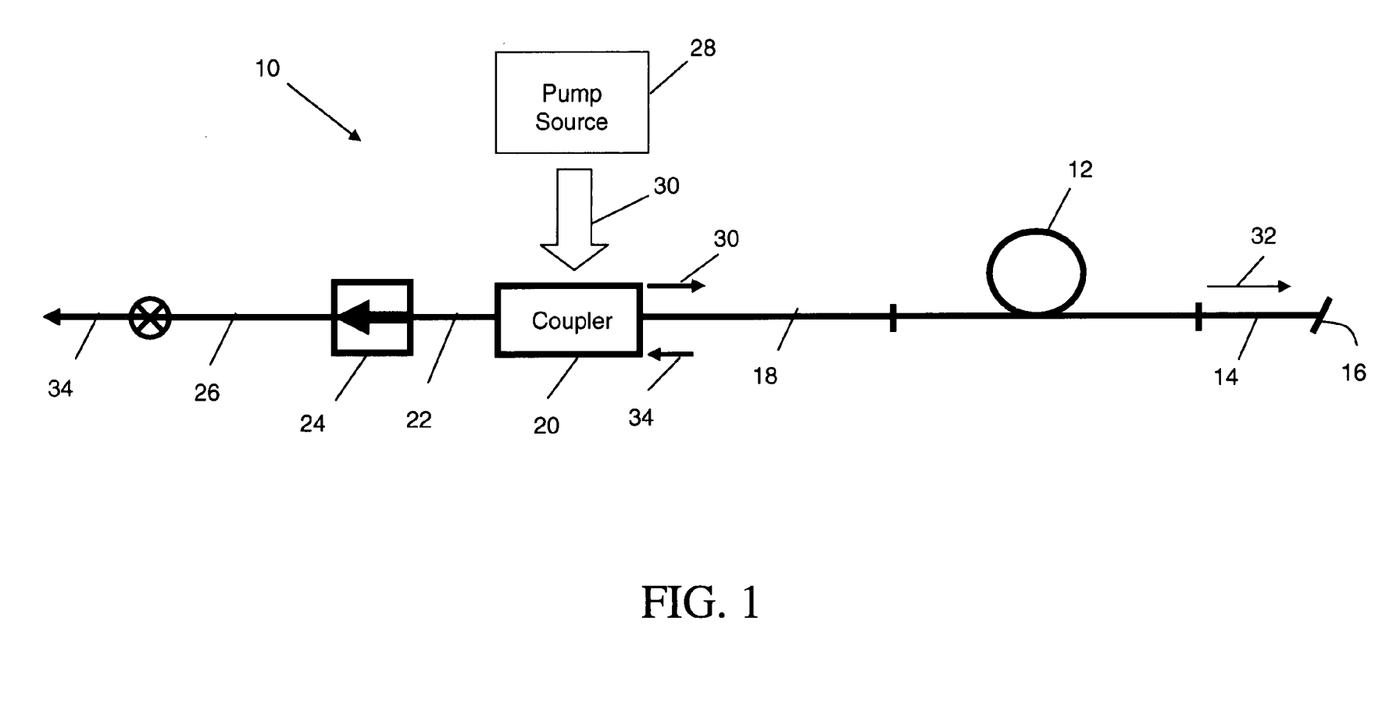
FIG. 1 is a diagram of a Yb-doped phosphate fiber ASE source in accordance with the present invention.

As shown in FIG. 1, an exemplary fiber ASE source 10 includes a length, 10-150 cm, of single-mode gain fiber 12 formed from Yb-doped phosphate glass. The fiber includes a doped-core and one or more undoped cladding layers. One end of the gain fiber is spliced to a length of fiber 14 whose open end 16 is angle cleaved and possibly immersed in index-matching gel. The other end of the gain fiber is spliced to a length of fiber 18 connected to a pump coupler 20 such as a thin-film WDM, fused fiber or TIR coupler (see U.S. Pat. No. 6,529,318). The pump coupler is connected to fiber 22, an isolator 24, and output fiber 26. All of the fibers except the gain fiber are suitably undoped single-mode silica fiber such as Corning 1060.

A pump source 28, e.g. a 976 nm single-mode or multi-mode pump diode, emits a pump signal 30 that is coupled into the fiber chain through pump coupler 20 and propagates in the fiber where it is absorbed by and excites the ytterbium dopant ions in the fiber core to produce spontaneous emission. The gain fiber is typically 10-150 cm long; sufficiently long to allow for the build-up of ASE and short enough to maintain adequate pumping to avoid unwanted propagation loss. The superfluorescent source output power is emitted in two directions, one of which is not used. The unwanted forward ASE 32 is attenuated by the last few centimeters of gain fiber 12, which are not efficiently pumped and thus function as an attenuator. The angle cleave at end 16 of fiber 14 allows the forward ASE to exit the fiber without introducing reflection of power back into the fiber. In an alternate embodiment, fiber 14 can be omitted and the end of the gain fiber angle cleaved. The backward ASE 34 propagates through the fiber chain to fiber 26 where it is emitted from the source. Isolator 24 keeps the pump signal from being emitted and prevents reflections of ASE power from returning into the ASE fiber. A double-pass ASE source would be very similar except a reflector would be formed at end 16 and the gain fiber length would be somewhat shorter to avoid attenuation of the forward ASE.

Figure 2:
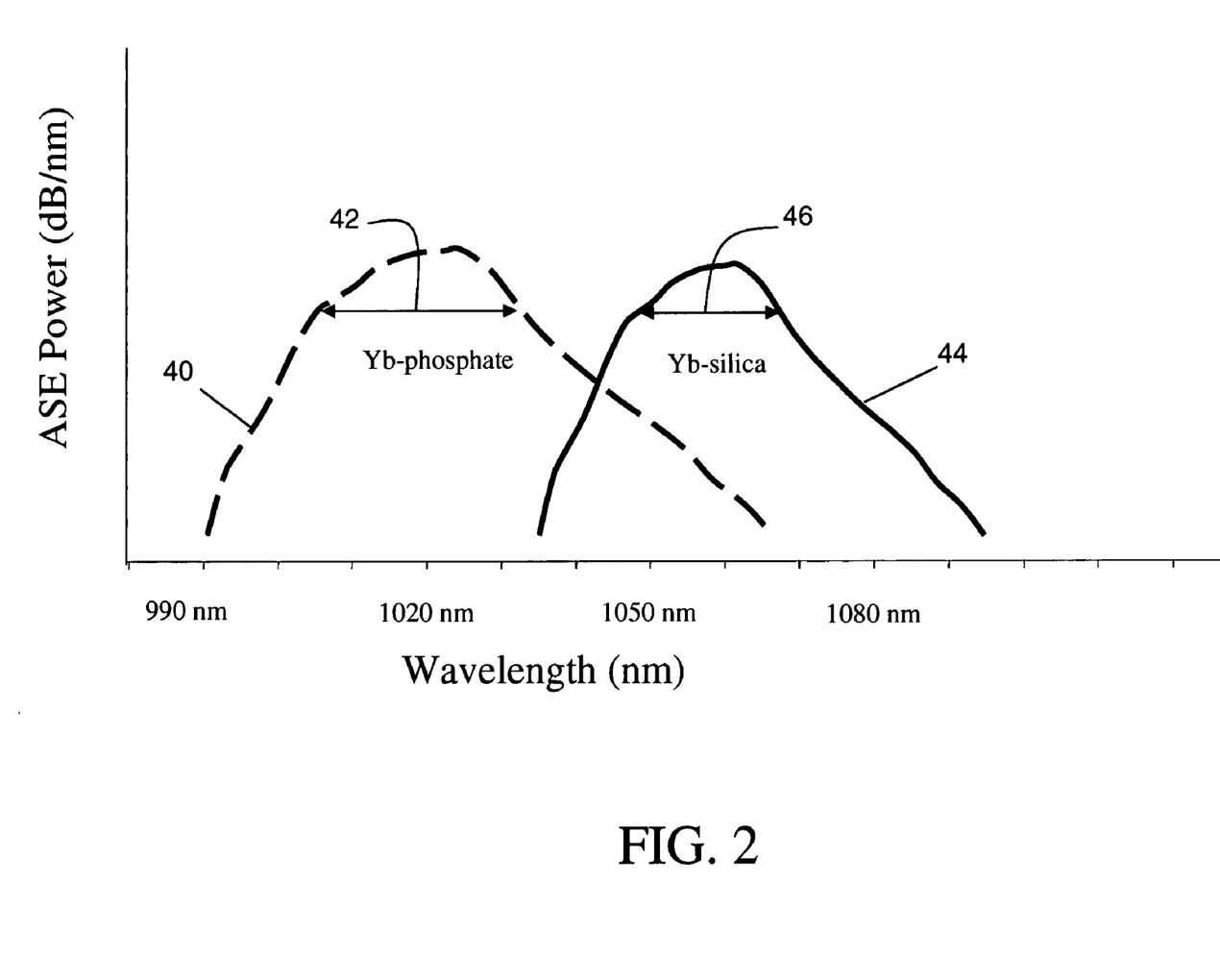
FIG. 2 is a plot comparing the emission bandwidth for Yb-doped phosphate glass to silica glass for conventional backward pumping.

Using this conventional backward pumping geometry, the phosphate-based ASE source can achieve fairly wide bandwidths. As shown in FIG. 2, the emission spectrum 40 of the fiber ASE source using the phosphate glass is centered near 1020 nm, 1010-1025 nm depending on length and dopant concentration, and has a full-width half-maximum (FWHM) bandwidth 42 of at least 10 nm, typically at least 20 nm and preferably about 25 nm. By comparison the emission spectrum 44 of a silica fiber ASE source is centered near 1060 nm and has a FWHM bandwidth 46 of about 20 nm. The wide bandwidth and shorter center wavelength will allow the phosphate-based fiber ASE source to address applications the silica fiber source can not reach. This configuration can produce at least 5 mW of saturated output power over the FWHM bandwidth and up to 50 mW.

To increase the bandwidth and improve the spectral shape, a number of different pumping configurations and ASE architectures can be used. To increase output power, the gain fiber may be pumped from both ends in a "dual-pumping" configuration or pumped with a multi-mode pump. In the former case, the second pump would be positioned at end 16 of fiber 14 and in the latter case the fibers would have multiple claddings in which to confine the propagating pump signal. To extend the bandwidth, the forward ASE of a second pumped gain fiber, either phosphate or a different glass host, can be used to seed the gain fiber (See FIG. 5) or the forward ASE from a silica fiber can be combined with the backward ASE from a phosphate fiber (See FIG. 7). Alternately, gain fiber 12 may comprise a concatenation of phosphate fiber segments with varying length and varying concentrations of Yb that extends the bandwidth. Filters such as spectral shaping filters or gain flattening filters can be inserted in the fiber chain at open end 16 or after isolator 24 to provide the desired output spectrum, e.g. Gaussian.

Yb-doped Phosphate Glass

Silica or germano-silcate (~100% $SiO_2$) glass consists of $SiO_4$ tetrahedra joined to each other at corners. Oxygen acts as a bridge between neighboring tetrahedra. This bonding structure provides minimal dopant sites. Yb-dopant concentrations for silica are <0.5 wt. % and typically <0.1 wt. %. Silica based fibers can not support higher doping concentrations on account of the photodarkening effect.

Figure 3:
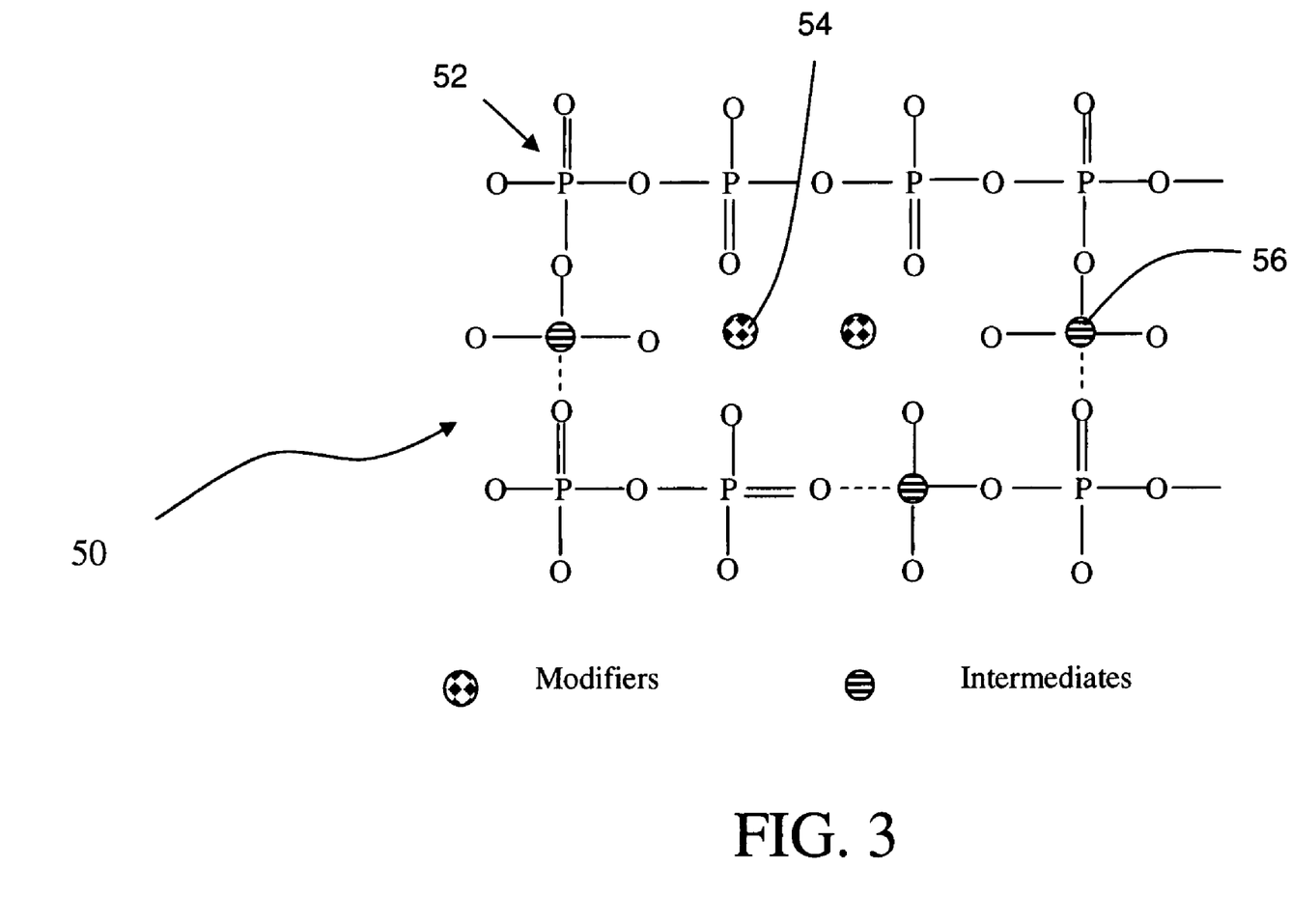
FIG. 3 is a diagram of the glass network for phosphate glass.

As shown in FIG. 3, the low temperature multi-component phosphate glass has a different bond structure. In a phosphate glass network 50, the basic unit of structure is the $PO_4$ tetrahedron 52. Because phosphate (P) is a pentavalent ion, one-oxygen from each tetrahedron remains non-bridging to satisfy charge neutrality of the tetrahedron. Therefore, the connections of $PO_4$ tetrahedrons are made only at three corners. In this respect, phosphate glass differs from silica-based glasses. The large amount of non-bridging oxygen in phosphate glass offers a great number of sites for dopant ions, which results in a high solubility of ytterbium ions. A modifier 54 modifies the glass network, thereby reducing its melting temperature and creating even more sites for dopant ions. A uniform distribution of dopant ions in the glass is critical to obtain a high gain per unit length. An intermediator 56 bridges some of the bonds in the network thereby increasing the network's strength and chemical durability.

Figure 4:
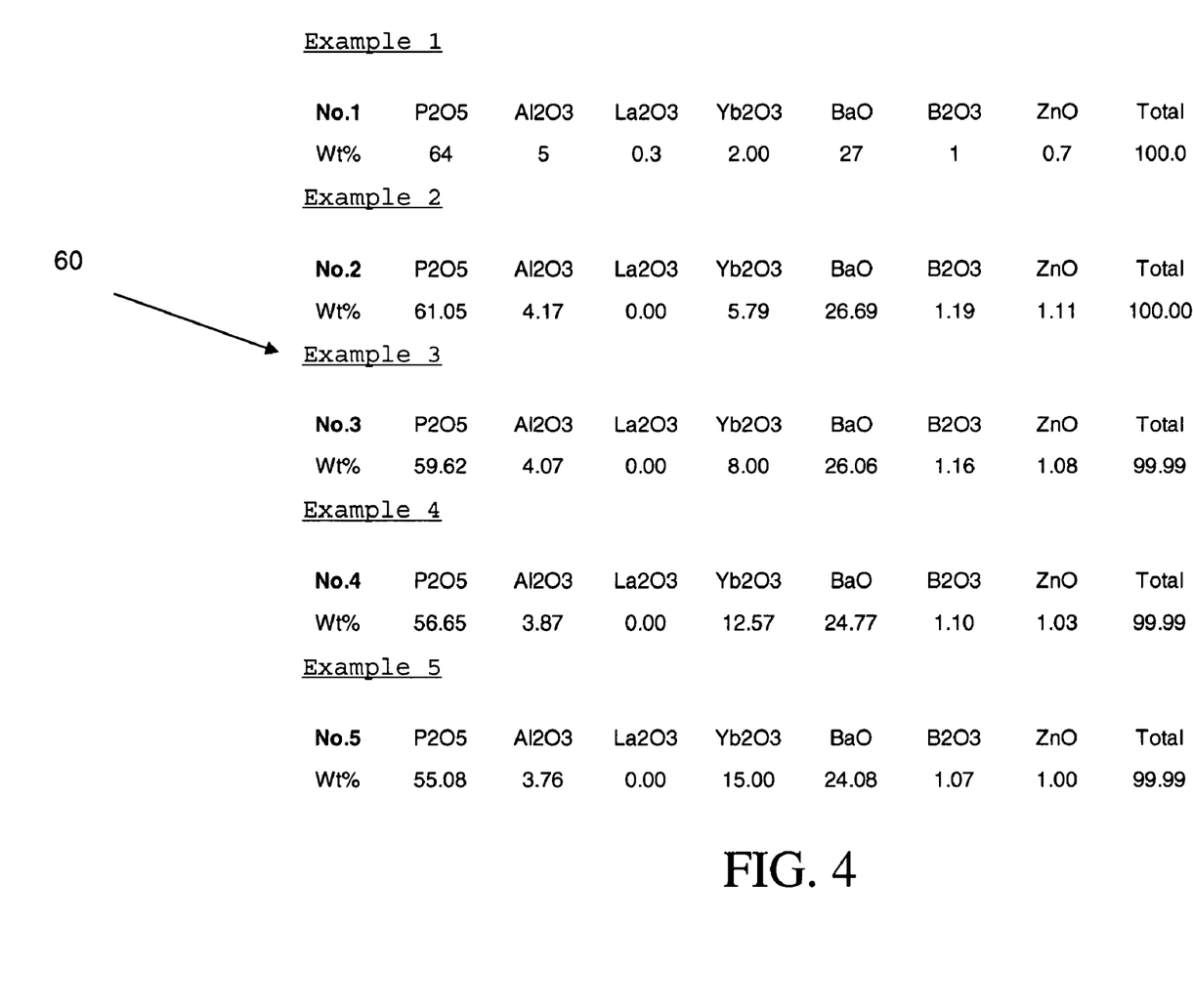
FIG. 4 is a table of Yb-doped phosphate glass compositions.

A phosphate-glass suitable for use in the 1-μm fiber ASE source comprises the following composition by weight percentages: a glass network former (phosphorus oxide $P_2O_5$) from 30 to 80 percent, but typically 50 to 70 percent a glass network modifier MO from 10 to 40 percent, and a glass network intermediator $L_2O_3$ from 7 to 30 percent, wherein MO is selected from the alkaline earth oxide group consisting of BaO, BeO, MgO, SrO, CaO, ZnO, PbO and mixtures thereof, and $L_2O_3$ is selected from $Al_2O_3$, $B_2O_3$, $Y_2O_3$, $Yb_2O_3$, $La_2O_3$, and mixtures thereof. The glass composition may be "alkaline-free" or may include some amount of alkaline metal oxides such $K_2O$, $Na_2O$, $Li_2O$ and $Rb_2O$ that provide additional network modifiers. The gain fiber core is doped with $Yb_2O_3$ of 0.5 to 30 wt. percent and typically 2 to 10 wt. %. Doping concentrations of greater than 20 wt. % have been observed without photodarkening. The cladding includes additional $La_2O_3$ to offset the core dopant. A table 60 of exemplary glass compositions for the fiber core is shown in FIG. 4. The cladding glass would be similar but with the $Yb_2O_3$ replaced with $La_2O_3$.

The single-mode fibers formed from phosphate glass have a much lower softening temperature (<600° C.) than silica (>1200° C.), which greatly simplifies the fiber drawing process but complicates the process of fusion splicing to silica fiber. Furthermore, the phosphate glass has a larger refractive index, and thus is more sensitive to reflections at splices to conventional silica fiber. A quality fusion splice should exhibit low optical loss (<0.3 dB), low back reflection loss (<−50 dB) and good tensile strength (>100 g). A standard silica-to-silica fusion splice may degrade the phosphate fiber. Instead an asymmetric process that softens only the multi-component fiber is employed as described in U.S. Pat. No. 6,705,771 entitled "Method of Fusion Splicing Silica Fiber with Low-Temperature Multi-Component Glass Fiber". To reduce back-reflection, an angle splicing process in which the silica fiber is angle cleaved, the multi-component fiber square cleaved and a matched angle formed in-situ may be employed as described in U.S. Pat. No. 6,866,429 entitled "Method of Angle Fusion Splicing Silica Fiber with Low-Temperature Non-Silica Fiber".

Seeded Fiber ASE Source

Figure 5:
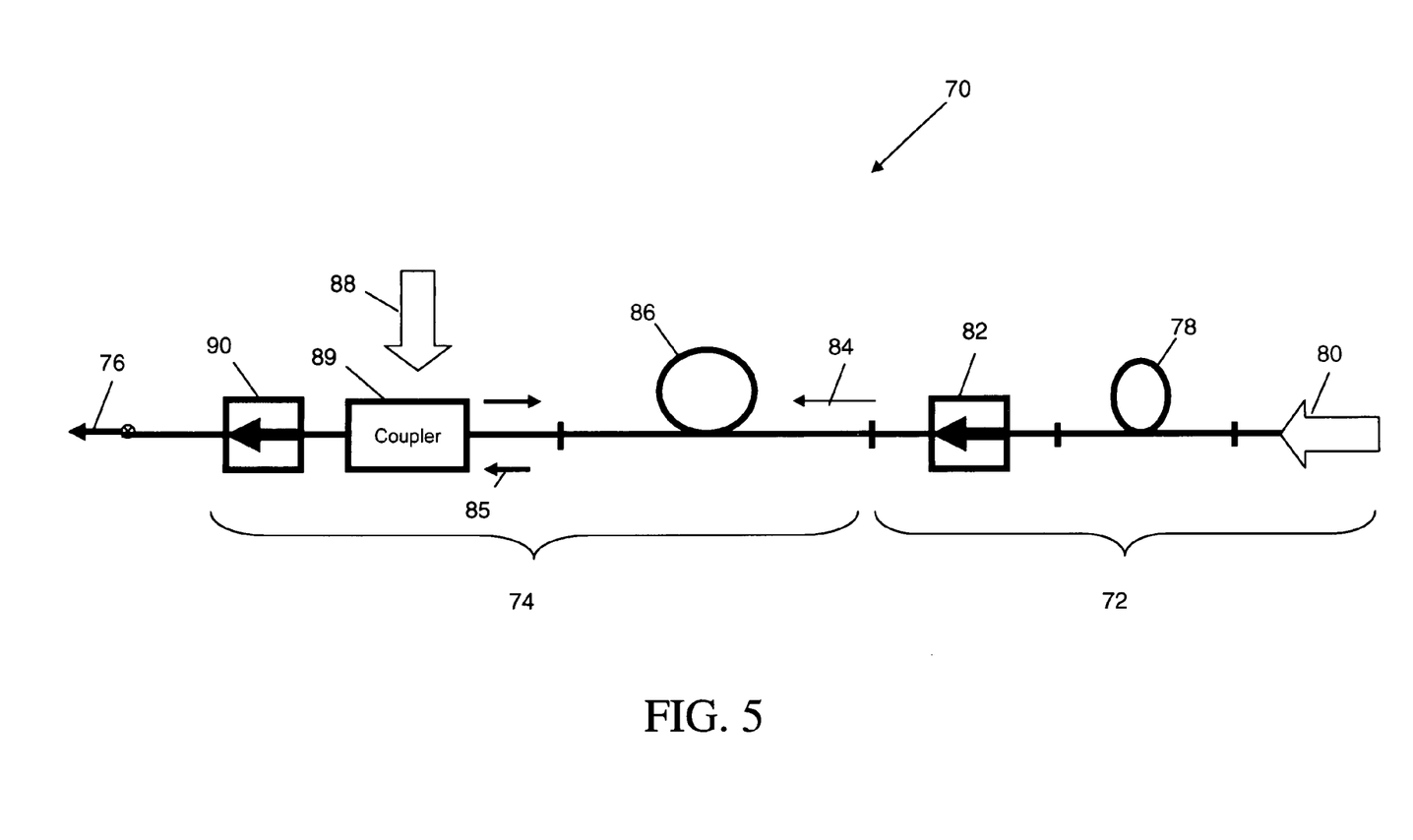
FIG. 5 is a diagram of a seeded Yb-doped phosphate fiber ASE source.
Figure 6:
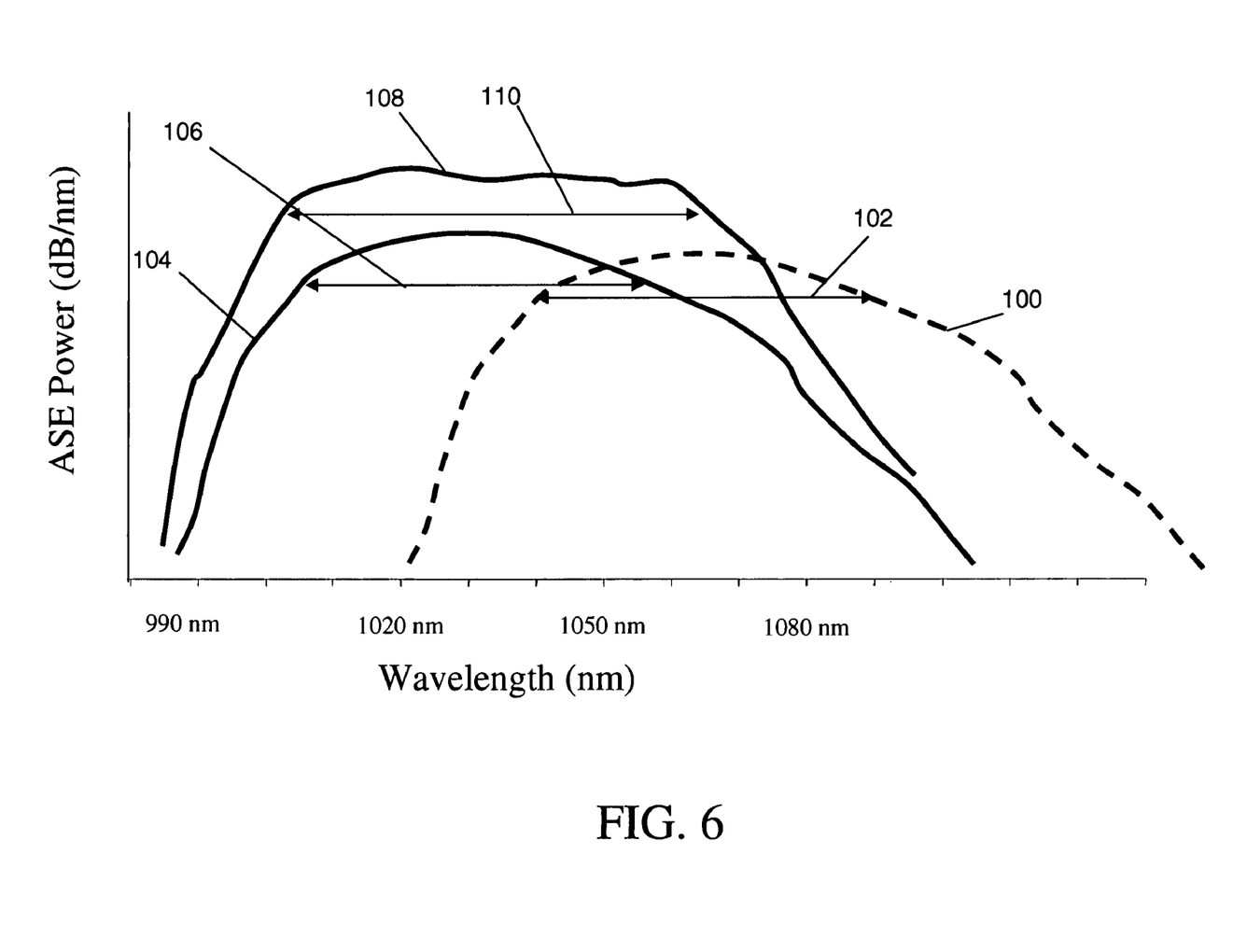
FIG. 6 is a plot comparing the emission bandwidth for seeded Yb-doped phosphate glass to seeded silica glass to Yb-doped phosphate glass with Yb-doped silica seed.

As shown in FIGS. 5 and 6, a fiber ASE source 70 can be configured with a seed stage 72 and an amplifying stage 74 to increase the emission bandwidth of a composite ASE 76 emitted by the source. Seed stage 72 includes a Yb-doped seed fiber 78, a pump 80 and an isolator 82 for isolating the pump from the amplifying stage 74 and for keeping ASE from the amplifying stage from entering the seed ASE stage. The seed stage can be configured in many different ways in order to tailor the spectrum of the source but the spectral shape of the seed ASE 84 is chosen such that it is to the long wavelength side of the backward ASE 85 of the amplifying stage. Amplifying stage 72 includes a Yb-doped phosphate gain fiber 86, a pump 88 and pump coupler 89 and an isolator 90 for isolating the pump from the backward ASE 76 emitted by the source and for preventing ASE reflections from re-entering the ASE source—which could lead to instability or lasing. The amplifying stage is configured so that it contributes its backward ASE 85 and amplifies seed ASE 84 to produce composite ASE 76. In this particular configuration, the seed stage is end pumped and seeds the amplifying stage with forward ASE.

The seed and amplifying stages must be designed to get the desired emission bandwidth and spectral shape. The amplifying stage determines the output power of the source and is optimized first. The length of gain fiber 86 is selected to properly amplify the seed ASE to expand the bandwidth of the source. The amplification of the seed relies on fact that the end of gain fiber 86 (closest to the seed stage) has gain from pump. If gain fiber 86 is too long, then pump is completely absorbed by the time it gets to the end of the fiber. In this example, a length of 70 cm is suitable. The length of seed fiber 78 is selected such that its peak emission rises where the B-ASE 85 of gain fiber 86 starts to drop. The seed power is adjusted by varying its pump power so that the seed power is enough to get amplified by gain fiber 86 but not too much that it robs all the power from gain fiber 86 into amplifying seed spectrum only. Otherwise only the seed would be amplified causing the spectrum to be distorted with no bandwidth expansion. Conversely, if the seed is too low, then the seed part of spectrum does not rise enough—and the composite spectrum is dominated by the backward ASE of the gain fiber.

As shown in FIG. 6, the emission spectrum 100 of a silica/silica configuration (Yb-doped silica gain fiber and Yb-doped silica seed fiber) is centered near 1060 nm and has a FWHM bandwidth 102 of approximately 45 nm, and thus can not reach wavelength below about 1040 nm. By comparison, the emission spectrum 104 of a phosphate/phosphate configuration is centered near 1030-1040 nm and has a FWHM bandwidth 106 of at least 20 nm (coherency length less than approximately 25 um in air) and preferably at least 50 nm (coherency length less than approximately 10 um in air). Assuming equal dopant concentrations, the seed fiber is typically longer (120 cm) than the gain fiber (70 cm). The emission spectrum 108 of a phosphate/silica configuration is centered near 1030-1040 nm and has a FWHM bandwidth 110 of approximately 60 nm. In this case, the seed fiber is considerably longer, at least 5 m, due to the much lower doping concentrations, typically 0.05-0.3 wt. %. Testing has shown that seeding the phosphate fiber with a silica fiber provides improved results because the emission bandwidth of silica is centered at longer wavelengths than that of phosphate. The seeded fiber ASE has demonstrated FWHM bandwidths of 50 nm—which corresponds to 10 um coherence length in air, 7 um coherence length in tissue.

Combined F-ASE Si Fiber and B-ASE Phosphate Fiber

Figure 7:
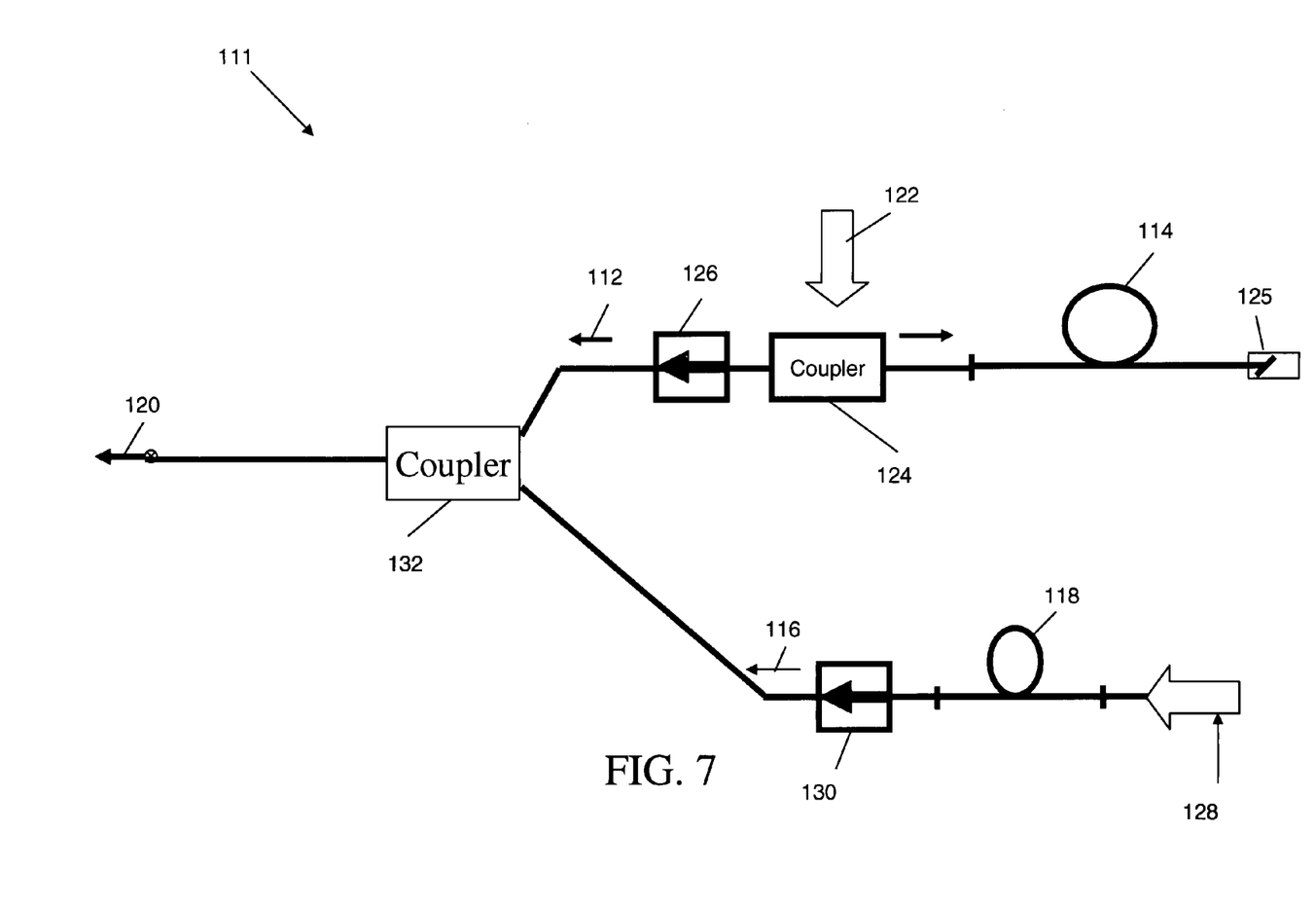
FIG. 7 is a diagram of an ASE source that combines the backward ASE from a Yb-doped phosphate fiber with the forward ASE from a Yb-doped silica fiber.
Figure 8:
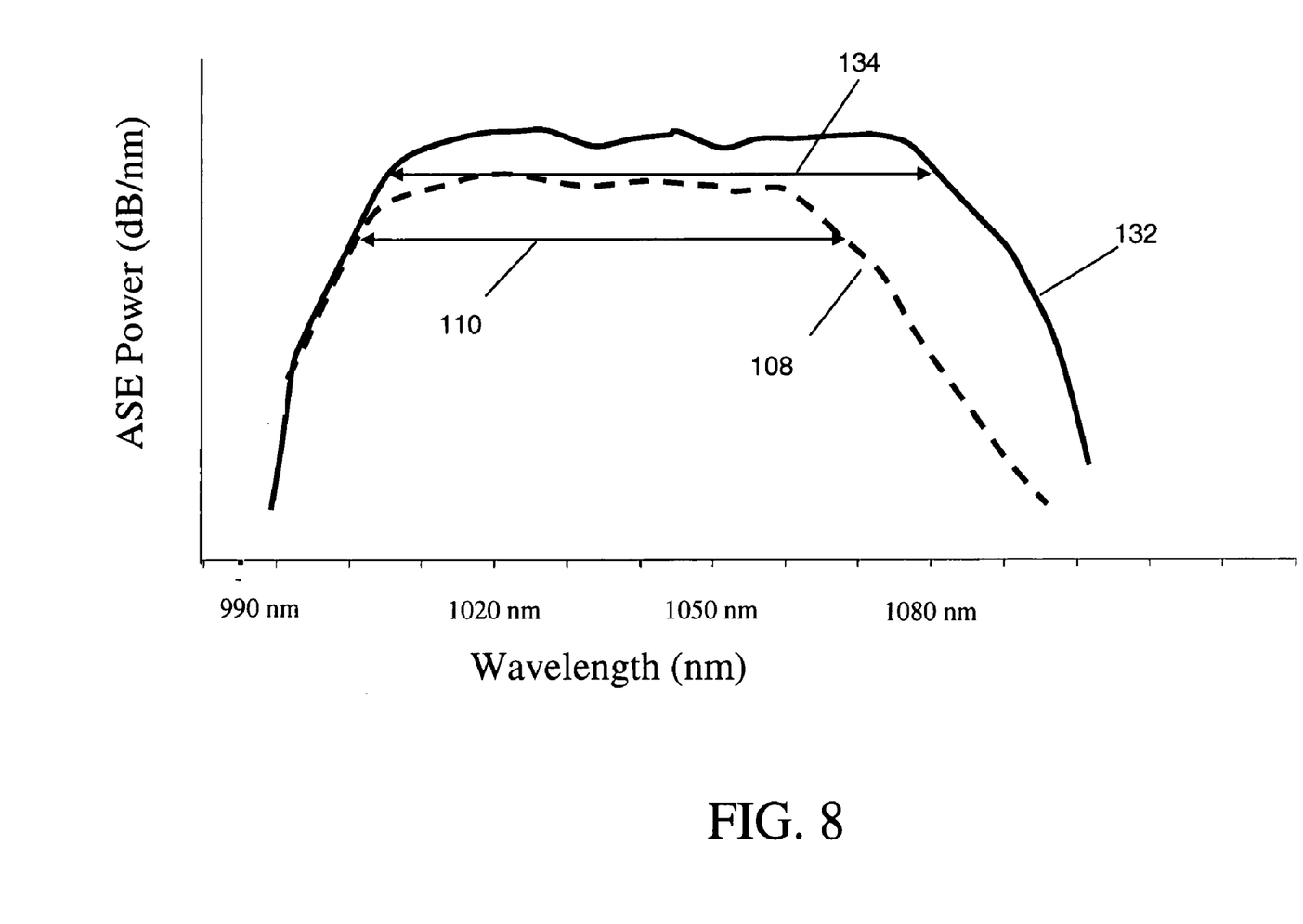
FIG. 8 is a plot comparing the emission bandwidth of the combined ASE and the seeded ASE.

As shown in FIGS. 7 and 8, a fiber ASE source 111 can be configured to combine the backward ASE 112 emitted by a Yb-doped phosphate fiber 114 and the forward ASE 116 emitted by a Yb-doped silica fiber 118 and emit a composite ASE 120 having a wide emission bandwidth.

A pump 122, single or multi-mode, is coupled into phosphate fiber 114, suitably 70 cm, via coupler 124 in a counter-propagating configuration to generate the backward ASE. In this example, the end of fiber 114 is angle cleaved 125 and encased in an index matching gel to remove the forward ASE. Isolator 126 blocks the pump from being coupled to the output of the ASE source and prevents reflections or other light sources from entering the ASE source. A pump 128 end pumps silica fiber 118, suitably 8 m, to generate the forward ASE. Isolator 130 blocks the pump from being coupled to the output and prevents reflections or other light sources from entering the ASE source. A 50/50 coupler 132 combines the backward ASE and forward ASE into the composite ASE 120 that is output from the source. The length of the F-ASE silica fiber is selected such that its peak emission rises where the B-ASE of Yb-doped phosphate starts to drop. The two pumps are adjusted to match power and optimize the overlap.

As shown in FIG. 8, this ASE source configuration generates an emission spectrum 132 having a FWHM bandwidth 134 that is wider than the FWHM bandwidth 110 of emission spectrum 108 generated by seeding the phosphate fiber with a silica fiber. This configuration is effective due to the spectral shift between the phosphate and silica fibers. The drawback of using this approach is that that ASE sources loses ½ the power when sources are combined in this manner—so it is by definition much less efficient in terms of using pump power than the seeded configuration.

Ophthalmic OCT

ASE sources are used in optical coherence tomography (OCT) and particularly in ophthalmic OCT. The source must have a short coherence length, preferably less than 10 μm, to provide the high resolution "thin slices" required for the optical biopsy of the eye, high power to penetrate the eye and spectral purity (low noise) at those high powers in order to maintain the desired resolution. The principles of OCT and the use of ASE sources are described by J. Fujimoto "Optical coherence tomography for ultrahigh resolution in vivo imaging", Nature Biotechnology, Vol. 21, No. 11, November 2003, pp. 1361-1367 and A. F. Fercher et al. "Optical coherence tomography—principles and applications", Institute of Physics Publishing, Rep. Prog. Phys. 66 (2003, pp. 239, 260-265 and 291.

Figure 9:
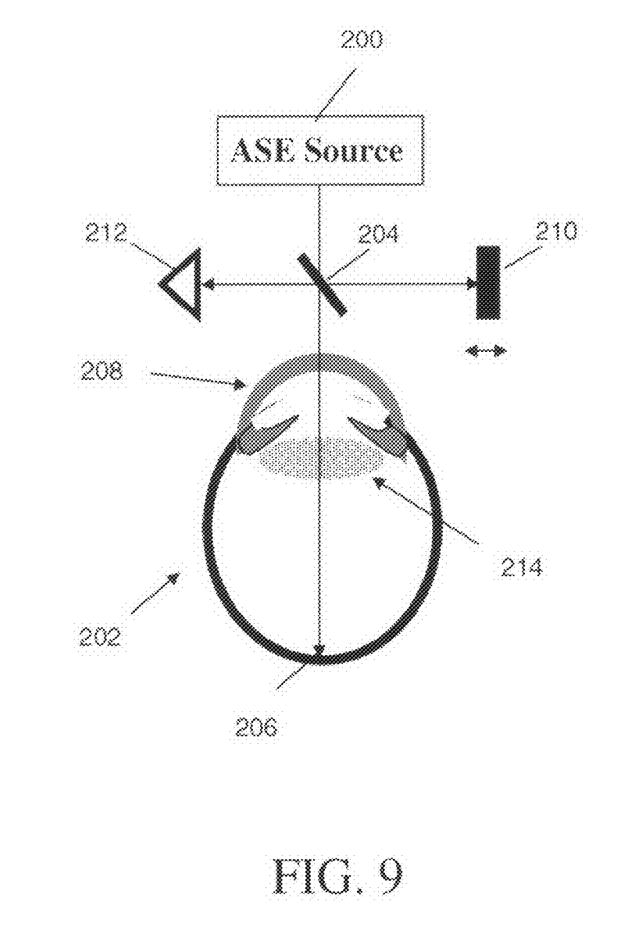
FIG. 9 is a diagram of an OCT procedure for imaging the cornea and retina using either an 850 nm source to image the retina and a 1300 nm source to image the cornea or a 1-µm phosphate-based fiber ASE source to image both simultaneously.

As shown in FIG. 9, an ophthalmic OCT set-up includes a light source 200 to image an eye 202. The incoherent light from the source is split into a transmitted beam and a reflected beam by beam splitter 204. The transmitted beam is projected into the eye to image the retina 206 and/or cornea 208. The reflected beam is directed to a moving reflector 210 and acts as a reference beam. The reflected scattered light from the cornea and/or retina and the reflected reference beam pass back through the beam splitter 204 to a detector 212. The interference of these two beams goes to demodulating electronics. The reference reflector moves axially allowing axial information (slices) to be imaged. The thickness of the slice (axial resolution) is determined by the coherence length of the source. Interference of the two beams only occurs when the path lengths are equal (to within the coherence length of source).

Using known ASE sources, two different light sources and possibly two sets of optics including the beam splitter, reflector and detector are required to image both the retina and the cornea. To image the retina, the beam must not be absorbed by the water in the lens 214. An 850 nm ASE source sees very low absorption and is the typical source for retinal scans. The beam should also penetrate the retinal tissue to provide the desired "thin slices" for the optical biopsy. To image the cornea, the beam should have long wavelengths to penetrate deeply. Since this source does not have to pass through the lens, a 1.3 μm source is conventional. Note, the 1.3 μm source can not be used to image retina because it would be completely absorbed by the water and the 850 nm source can not be used to image the cornea because it provides inadequate penetration. In a typical procedure, the 850 nm source is used to image the retina and then replaced with the 1.3 μm source and, if necessary, other components interchanged, to image the cornea.

The phosphate-based 1-μm fiber ASE source can be used to either perform only the retinal scan with better penetration, approximately 2×, than the 850 nm source and/or perform both the retinal scan with higher performance and the corneal scan with adequate resolution in a single pass. For the retinal scan, water has an absorption window at approximately 1020-1060 nm, which overlaps fairly closely with the FWHM emission bandwidth of the phosphate-based ASE source. Therefore, the 1-μm source can reach the retina with only marginally higher loss than the 850 nm source and than penetrate about 2× as deep to provide a better biopsy.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A test station for performing OCT on the eye, comprising:
    an ASE source including an amplifying stage including the Yb-doped phosphate glass optical fiber of 10-150 cm in length that generates backward ASE in response to a first pump and a seed stage including a Yb-doped phosphate or silica fiber that generates forward ASE in response to a second pump to seed the amplifying stage, said amplifying stage emitting a composite ASE having a full width half maximum (FWHM) emission bandwidth that spans at least 1020 nm to 1040 nm as a light beam;
    a beam splitter that splits the beam into a first beam and a second beam, said second beam projected into an eye to image the retina in a reflected scattered beam;
    a reflector that reflects first beam to act as a reference beam; and
    a detector that receives the reference beam and the reflected scattered beam from the retina that pass back through the beam splitter and interfere at the detector.

2. The test station of claim 1, wherein the phosphate glass comprises the following ingredients by weight percentages,
    30 to 80 percent phosphate-oxide $P_2O_5$,
    $L_2O_3$ of at least 7 percent, where $L_2O_3$ is selected from $Al_2O_3$, $B_2O_3$, $Y_2O_3$, $Yb_2O_3$, $La_2O_3$, and mixtures thereof, and MO of at least 10 percent, where MO is selected from BaO, BeO, MgO, SrO, CaO, ZnO, PbO and mixtures thereof.

3. The test station of claim 1, wherein the phosphate glass fiber is doped with 2-10 wt. % ytterbium-oxide.

4. The test station of claim 1, wherein the second beam simultaneously images the retina and the cornea, said detector receiving the reflected scattered beam to biopsy both the retina and the cornea in a single pass.

5. The test station of claim 1, wherein the ASE source has a coherence length less than 10 μm.

6. A test station for performing OCT on the eye, comprising:
An ASE source including an amplifying stage including a Yb-doped phosphate glass optical fiber that generates backward ASE having a peak region of its emission spectrum centered near 1020nm in response to a first pump and a seed stage including a Yb-doped optical fiber that generates forward ASE having a peak region of its emission spectrum centered to the long wavelength side of the peak region of the backward ASE in response to a second pump to seed the amplifying stage,
said amplifying stage's first pump configured to provide gain at the end of the Yb-doped phosphate glass optical fiber closest to the seed stage to amplify the forward ASE, and
said seed stage's second pump power configured so that said amplifying stage amplifies both the peak regions of the backward and forward ASE to emit a composite ASE as a light beam that expands the bandwidth of the seed stage forward ASE, said composite ASE having full width half maximum (FWHM) spectral emission bandwidth of at least 30 nm that spans at least 1020 nm to 1040 nm;
a beam splitter that splits the beam into a first beam and a second beam, said second beam projected into an eye to image the retina in a reflected scattered beam;
a reflector that reflects first beam to act as a reference beam; and
a detector that receives the reference beam and the reflected scattered beam from the retina that pass back through the beam splitter and interfere at the detector.

7. The test station of claim 6, wherein the seed stage's optical fiber comprises phosphate glass.

8. The test station of claim 6, wherein the seed stage's optical fiber comprises silica glass, said fiber at least 5 m in length.

9. The test station of claim 6, wherein the length, dopant concentration and/or host glass of the Yb-doped optical fiber are configured to produce the emission spectrum of the forward ASE center to the long wavelength side of the emission spectrum of the backward ASE.

10. The test station of claim 9, wherein the emission spectrum of the backward ASE and forward ASE overlap.

11. A test station for performing OCT on the eye, comprising:
an ASE source comprising:
an optical gain fiber having a proximal section with a proximal end and a distal section with a distal end including,
at least one cladding layer formed from phosphate glass; and
a core formed from phosphate glass and doped with 0.5-20 weight % of ytterbium-oxide; and
a pump source that injects optical energy into the proximal end of the first optical gain fiber to excite the ytterbium oxide ions in the core and provide gain in said proximal section to build-up backward and forward ASE in the proximal section of the gain fiber and to provide loss in said distal section,
wherein said pump source and optical gain fiber are configured for backward propagation of said backward ASE through the proximal end of the fiber as a light beam with a full width half maximum (FWHM) spectral emission bandwidth of at least 1020 nm to 1040 nm and for forward propagation of said forward ASE through the distal end of the fiber to attenuate the forward ASE; and
a section of angle cleaved fiber at the distal end of the gain fiber that allows the attenuated forward ASE to exit the gain fiber without reflecting power back into the gain fiber;
a beam splitter that splits the beam into a first beam and a second beam, said second beam projected into an eye to image the retina in a reflected scattered beam;
a reflector that reflects first beam to act as a reference beam; and
a detector that receives the reference beam and the reflected scattered beam from the retina that pass back through the beam splitter and interfere at the detector.

12. A test station for performing OCT on the eye, comprising:
a first ASE source including a Yb-doped phosphate glass optical fiber that generates backward ASE having a peak region of an emission spectrum centered near 1020nm in response to a first pump; and
a second ASE source including a second Yb-doped optical fiber that generates forward ASE having a peak region of an emission spectrum centered to the long wavelength side of the backward ASE in response to a second pump; and
A coupler that combines the backward ASE and forward ASE into a composite ASE having a full width half maximum (FWRM) spectral emission bandwidth of at least 50 nm that spans at least 1020 nm to 1050 nm as a light beam;
a beam splitter that splits the beam into a first beam and a second beam, said second beam projected into an eye to image the retina in a reflected scattered beam;
a reflector that reflects first beam to act as a reference beam; and
a detector that receives the reference beam and the reflected scattered beam from the retina that pass back through the beam splitter and interfere at the detector.

13. The test station of claim 12, wherein the Yb-doped phosphate glass optical fiber is 10-150 cm in length and the second Yb-doped optical fiber is a silica fiber at least 5 m in length.

14. The test station of claim 12, further comprising:
a seed stage including a third Yb-doped optical fiber that generates forward ASE to the long wavelength side of the backward ASE in response to a third pump to seed the first ASE source.

15. The test station of claim 14, wherein the optical fiber in said seed stage is a silica based fiber.

16. The test station of claim 12, wherein said first and second pumps are configured to match the output power of said backward and forward ASE.

17. The test station of claim 1, wherein the reflector moves to modulate the reference beam.

18. A test station for performing OCT on the eye, comprising:
an ASE source including an amplifying stage including the Yb-doped phosphate glass optical fiber of 10-150 cm in length that generates backward ASE in response to a first pump and a seed stage including a Yb-doped phosphate or silica fiber that generates forward ASE in response to a second pump to seed the amplifying stage, said amplifying stage emitting a composite ASE having a full width half maximum (FWHM) emission bandwidth that spans at least 1020 nm to 1060 nm as said light beam as a light beam;

a beam splitter that splits the beam into a first beam and a second beam, said second beam projected into an eye to simultaneously image the retina and cornea in a reflected scattered beam;

a reflector that reflects the first beam to act as a reference beam; and a detector that receives the reference beam and the reflected scattered beam from the retina and cornea that pass back through the beam splitter and interfere at the detector to biopsy both the retina and the cornea in a single pass.

\* \* \* \* \*